Nov. 11, 1947.  O. E. BATORI  2,430,599
SLIDE RULE
Filed July 22, 1944  3 Sheets-Sheet 1
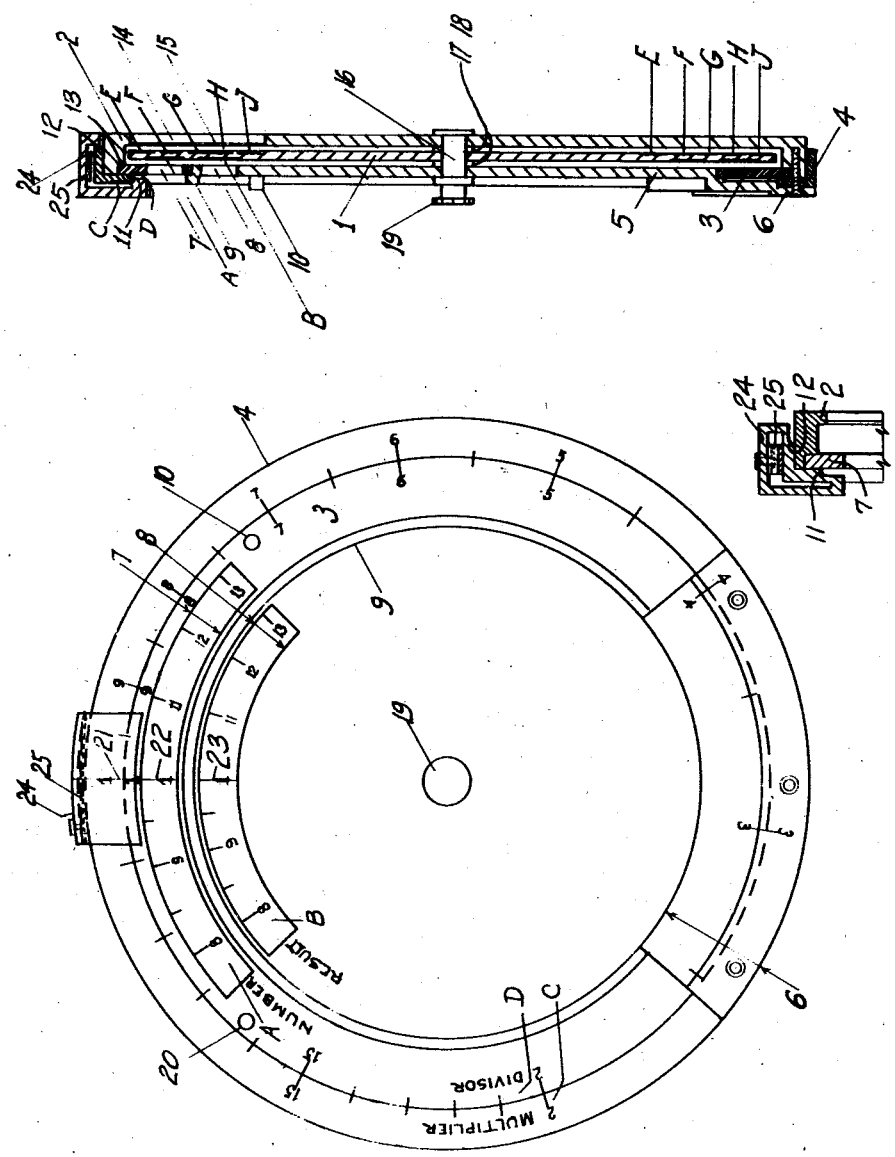
Oscar E. Batori
INVENTOR
BY Julian J. Wittel
his Attorney Nov. 11, 1947.  O. E. BATORI  2,430,599
SLIDE RULE
Filed July 22, 1944  3 Sheets—Sheet 2

Oscar E. Batori
INVENTOR
BY Julian Wittl
his attorney

Nov. 11, 1947.   O. E. BATORI   2,430,599
SLIDE RULE
Filed July 22, 1944   3 Sheets-Sheet 3

Oscar E. Batori
INVENTOR
BY Julian W. Wittal
his attorney

Patented Nov. 11, 1947

2,430,599

UNITED STATES PATENT OFFICE 2,430,599

SLIDE RULE

Oscar E. Bátori, New York, N. Y.

Application July 22, 1944, Serial No. 546,085

6 Claims. (Cl. 235—84)

This invention relates to computing devices of the slide rule type and specifically is an improvement upon the devices of this character which form the subject matters of my applications for Letters Patents of the United States, filed August 2, 1941, Serial No. 405,235, which is now Patent No. 2,358,309, granted September 19, 1944, and May 20, 1944, Serial No. 536,473, now Patent No. 2,415,231, granted February 4, 1947, respectively.

One important feature of those inventions is the simultaneous moving and setting of the coacting scales, whereby the two factors of a computation, represented by such two coacting scales, are set simultaneously so that the computation is greatly expedited. For this purpose an adequate arrangement is employed, among others two rotating discs, with a driving mechanism for each disc. Complementary to their mechanism, selected scales are placed on their different parts in an adequate arrangement in accordance with the mechanism.

I have found, that this feature of my said earlier invention, that is the simultaneous setting of the two factors of a computation, is not required in all cases. With that changed condition of the computations, that is with the omission of the simultaneous setting of the two factors of the computation, the device can be simplified. In arrangement, in mechanism and in the selection and disposition of the scales, that is in the scale system.

With this in mind I have modified in part my said earlier invention.

The said two rotating discs, each of which has offset parts in said earlier device, are now made plane. One of the two, the rear disc, which is rotatable in the earlier device, is being kept rotatable, in this too, on the other hand, the other, the front disc, which is rotatable in the earlier device, is made stationary in the present one. The driving mechanisms of the rotatable discs of the earlier devices, are being omitted in this one. For rotating the rear disc of this invention, a simple arrangement is applied, which consists of a bolt axle with a knob at its end, instead of the two separate gear mechanisms of the earlier devices.

By those modifications the device, as a mechanism, is simplified, and its production costs greatly reduced.

Having modified in part the mechanism, and in consequence of it, the selection and disposition of the scales has also been modified.

A slide rule is provided through the present invention by which numerical, trigonometric and exponential problems can be solved in a new procedure. Specifically, computations, where different terms are involved, are solved in a more simple, characteristic and positive manner.

The invention resides in the new mechanical arrangement and in the new selection and disposition of the scales applied.

For the sake of better explanation, a brief comparison is made between prior slide rules and this invention.

Prior slide rules, in general, apply two scales in a simple calculation, which represent all the ingredients of a computation, and the different computations, respectively. One scale, generally called the base scale, is used for the multiplicand and the product, in case of multiplication, and for the dividend and the quotient, in case of division, that is for four ingredients—in the two cases. The other coacting scale called the slide scale is used for both, the multiplier and divisor in the respective computations, that is for the two ingredients in two different computations.

The same two scales being used for different purposes the procedures are different and certain rules are to be followed in the procedure, which are complicated for the users without mathematical background and require considerable mental efforts even by the advanced users. Prior slide rules, in general, apply one indicator, which is used to set the factors of a computation in sequence and then it is moved to indicate the results. It is used for both purposes—and whenever set, anew, it destroys the previous indication, having been moved away from it. The result of a computation, which is understood to be the product in a multiplication, and the quotient in a division, will appear at different locations in the slide rule. This invention departs from the prior slide rules in the scale system and in the procedure. Eliminates the setting rules in the procedure, by the application of separate scales for each ingredient of the computation, and designates the scales according to their purpose. There is a scale for the number to be multiplied or divided, a scale for the multiplier and a scale for the divisor. Each one of these scales are correspondingly labeled as "Number," "Multiplier," "Divisor" and "Result." The procedure consists of the pure mechanical application or setting of these so labeled scales—instead of being governed by setting rules as with prior slide rules. This invention applies three indicators each one indicating one of the three ingredients, keeping their indications throughout and at the end of the procedure. One important improvement is the application of a result indicator member, as a separate special indicator. It is the sole indicator for the results and for the results only. It is stationary—and as such automatic. No move for its placement is required. It indicates the numbers, representing the results, at a permanent location of the device and in vertical position, facilitating the finding and the reading of these numbers, being especially advantageous in case of slide rules of the circular type. It holds this feature regardless of the kind of computations and of the terms involved. It indicates the result at the same location, in vertical position uniformly—in simple computations, in continuous computations, in combined computations and in computations involving different terms.

Another important feature of this invention is, that the procedures with different terms are separated—by different scales for different terms on independent members of the device.

The application of separate scales for the multiplier and the divisor implies also the separation of the procedures of the multiplication and division.

Prior slide rules have in general three members—one base, one slide, and one indicator. Slide and indicator are movable. This invention has an entirely different arrangement. It has four members. One housing, one rotating disc, one indicator ring and one result indicator. Of these four members the housing and the result indicator are stationary—the disc and indicator ring are rotatable. In the figures, with the exception of the result indicator, all of the aforesaid elements carry scales on them. These and other objects of this invention are obtained by the proper selection and disposition of logarithmic scales and by an adequate mechanical arrangement all embodied in the device, as it will be described in detail, hereinafter, reference being had to the drawings, in which:

Fig. 1 indicates a front face of the device.

Fig. 2 is a cross sectional view.

Figure 2a is a cross sectional view of the peripheral indicator, enlarged.

Figure 3:
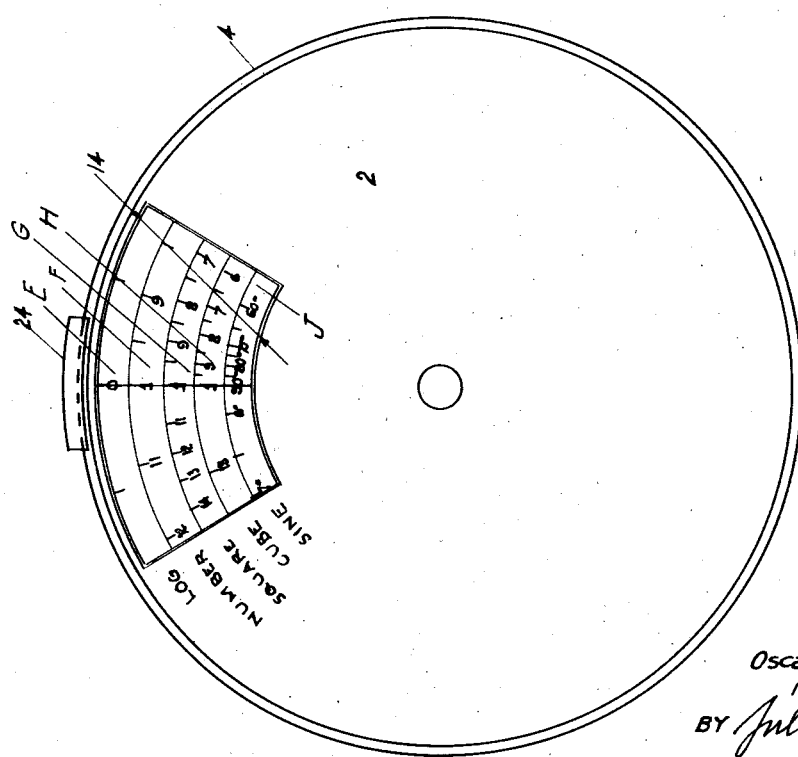

Fig. 3 indicates the reverse face of it.

Figure 4:
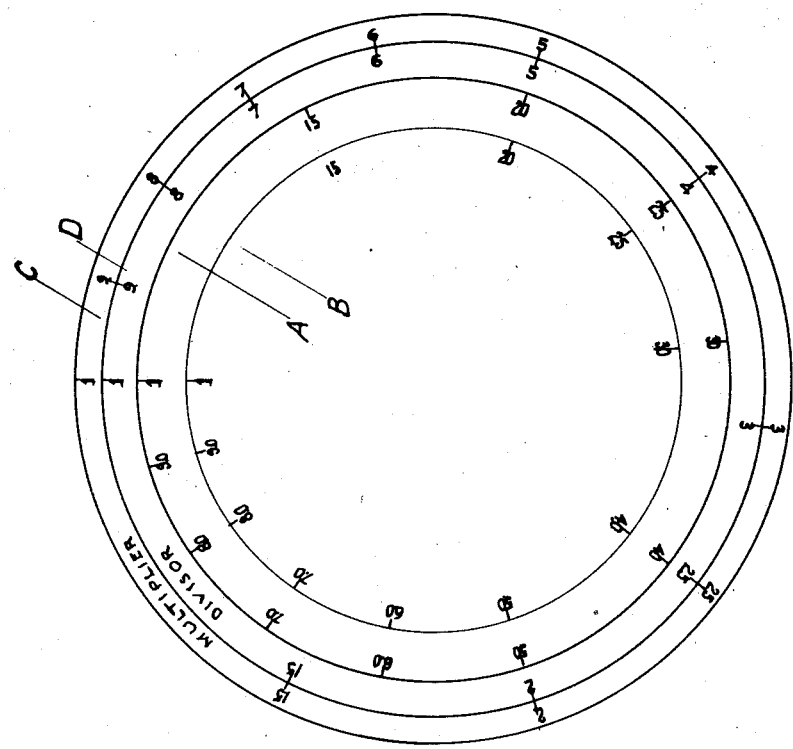

Fig. 4 indicates logarithmic scales on the front face of the device, selected and disposed to solve problems involving numerical quantities.

Figure 5:
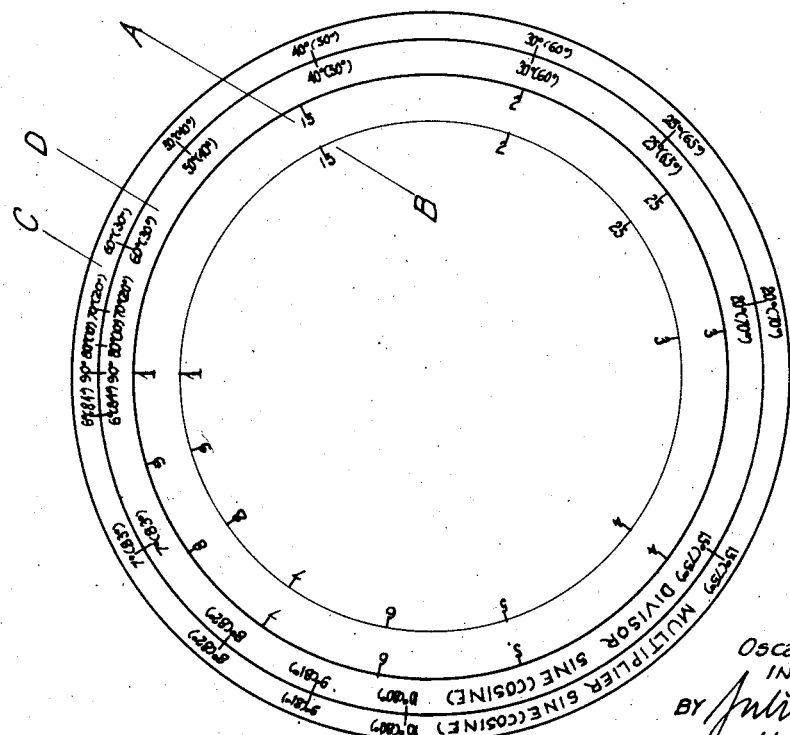

Fig. 5 indicates logarithmic scales on the front face of the device, selected and disposed to solve problems of sine, cosine or combined sine cosine and numerical quantities.

Figure 6:
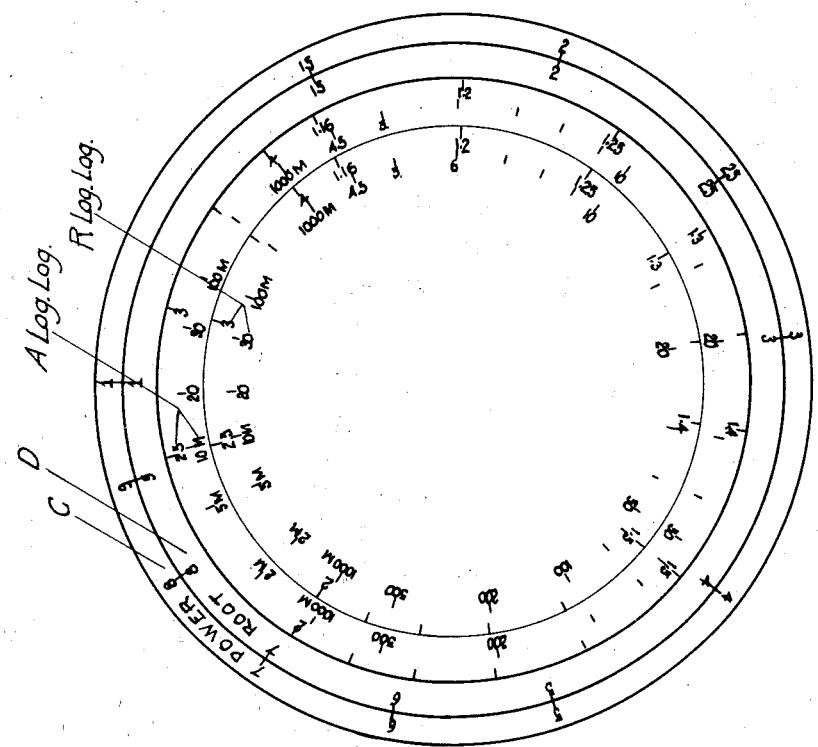

Fig. 6 indicates scales on the front face of the device with a farther variation in the scales to solve problems involving numerical and exponential quantities. In all these figures the scales are indicated by main graduations. The subgraduations are not indicated.

In said figures the housing member 2 is a circular plate with a forwardly directed flange, which has at its front face a recess to accommodate the indicator ring member 3.

Housing member 2 has in its reverse face an opening 14, which accommodates the window 15. Part 4 is a ring, having a rearwardly directed flange, is part of the housing member 2 and is referred to as housing member. The edges of this ring are bevelled to hold in place the peripheral indicator 24. Ring 4 holds indicator ring member 3 in place against a movement toward the front. Housing member 2 and ring 4—support indicator ring member 3 and provide for its independent support and rotation.

Indicator ring member 3 has an opening 7 and a thin wire 22 at its middle. This is called the setting indicator, all numbers to be multiplied or divided are to be set to this wire or line 22. Corresponding to its role the ring 3 carries the designation "Number." Ring 3 has two holes, 13 and 20, in its top side, into either of which a peg can be placed or removed from either of which to serve as a handle for rotating ring 3. Two holes are required because the lower offset leg part 6 of the stationary indicator member 5 will on rotation of the ring interfere with the peg, which then may be put in the other hole.

Result indicator member 5 is a circular plate, having a forwardly offset rim 9 and another offset part 6, on its lower part, as viewed in Figs. 1 and 2 which is the continuation of the circular plate 5 in an outward direction. The offset part 6 is of transparent material to expose the scales under it, on indicator ring member 3 and ring 4. It has an opening 8 and a thin wire 23 in its middle, which is called the result indicator, being the sole indicator of the result of any computation. Accordingly it is designated with the word "Result." This result indicator member is fixed to the housing member 2 by screws. The screws are passing through the front flange of the housing member 4, have depressed heads which hold the leg part 6 and the stationary indicator itself in place against rotation as will be understood. It is stationary and so are with it the result indicator 8 and its indicator line 23. In its center it has a hole which accommodates the bolt 16, which in turn holds in place the center of this result indicator member. Ring 4, described before is secured to housing member 2 by screws.

Rotatable disc member 1 is a circular plate, secured at its center to bolt 16. Rotating bolt 16 by knob 19 will rotate disc member 1. Bolt 16 is journalled in housing member 2 and result indicator member 5. It carries two spacing washers 17 and 18, which are providing for adequate clearance for the rotating disc member 1 against the housing member 2 and result indicator member 5. The two edges 11, 12 of ring 4 are beveled to provide a path for the travelling peripheral indicator 24 and to hold it in place. Peripheral indicator 24 has on its two inner edges the bevels as those of ring 4. Indicator 24 travels on these bevels and is also held in place by a spring 25, the one end of which is riveted to the indicator. Indicator 24 preferably is made of transparent material. It has a scratched line, or a thin wire, its indicator line, in its middle, which serves to bring in alignment two numbers or graduatons on the two adjacent scales, one on the ring 4, the other on the indicator ring member 3. Indicator 24 is movable around the outer edge of the device, except at the offset part 6 of the result indicator member 5.

Opening 14 of the housing member 2 is furnished with the transparent sheet or window 15, set in the opening 14. It has a scratched line or thin wire at its middle as a governing stationary line to which all numbers of the scales, on the reverse face of rotating disc member 1, are to be set and read, respectively.

Logarithmic scales are placed on the front face of ring 4, labeled "C," on the front face of indicator ring member 3, labeled "D," and on the front face of the rotatable disc member 1, labeled "A," "B." Figures 1 to 6 indicate various arrangements of different scales. These scales are labeled with the same capital letters, "A," "B," "C," "D" as being on the respective members even if they are different.

Any scale in these figures indicated by "A" or "B" is placed on the rotating disc member 1; scales indicated by "C" are on ring 4; scales indicated by "D" are on indicator ring member 3. The different scale arrangements are shown in different figures (Figs. 4 to 6) for the sake of clearness.

Scales C and D are exposed in their full length. Scales A and B are concealed except at their respective windows 7 and 8 where they are exposed.

Referring to Figs. 1 and 4 to 6, setting the initial point 1 of scale D on indicator ring member 3 to any number on scale C, multiplication will be performed. For the sake of brevity the initial points of any scale will be referred to hereinafter as the index of the respective scale.

Setting any number on scale D on indicator ring member 3 to the index of scale C on ring 4, division is performed. Thus scale C is a multiplier scale and is labeled "Multiplier," scale D is a divisor scale and is labeled "Divisor." These C and D scales are identical, and can be of any term. Then they are multiplier and divisor scales in that term.

In Figures 1 and 4 they are numerical, in Figure 5 sine, cosine, scales. In each case the C scale is a multiplier, the D scale is a divisor scale. By these separated and designated scales the procedure of the two kinds of computation is separated and made into a mechanical setting of designated scales without rules.

In case of exponential problems—the arrangement shown in Figure 6 is applied. In it C scale is for the power exponent by which the number is to be raised and the D scale is for the root exponent, by which the number is to be extracted—and are designated for these purposes as "Power" and "Root," similarly as the scales for multiplication and division, as mentioned hereinbefore.

The scale A is a designated scale for the number to be multiplied or divided. Any number on it set to the setting indicator line 22—is set for multiplication or division. Scale B is a designated scale for the results.

To make a single computation as multiplication or division with this invention—three scales are required, scale A for the number, scale B for the result and scale C for the multiplier. Thus in case of multiplication A, B, C scales constitute a scale system of three coacting or working scales—each having a different role. In case of division, similarly three scales are necessary to perform it, being scales A, B, D, the three again constituting a coacting scale system.

In Fig. 2 are indicated scales labeled "E," "F," "G," "H," "J." These scales are also indicated in Fig. 3. These scales are concealed by the housing member 2, exposed only at the opening 14. All these scales on the reverse face of disc 1 are inverted related to the scales A and B on the front face of disc 1. The scales on the front face of rotating disc 1, and on its reverse face, will indicate, at their respective indicators, the same numerical values and thus the scales in the reverse face are cooperative with the front scales.

Scale E indicates the logarithms of the numbers on the scale F, which is a standard log-scale of one unit length; G is a standard logarithmic scale of two units indicating the squares of the numbers on scale F; H is a standard log-scale of three log-units indicating the cubes of the numbers on scale F; scale J is a sine scale of one unit length, of which the numerical values are indicated on scale F.

For the sake of better explanation illustrative examples will be presented hereinafter—to demonstrate the procedure of a computation by this invention, the new principles applied in the selection and disposition of log-scales and the simplicity of its use. It will be given in the examples, the setting, with notes pointing to its advantage and with reference to procedures with prior slide rules. Reference will also be given to the respective figures in a descriptive manner. In the examples "setting," it will be understood means to move any scale and to set the desired number on it to its respective indicator or to the index of a scale.

Illustrative Example No. 1: Reference is made to Figures 1 and 4 with scales for numerical problems. This example illustrates a simple multiplication:

$$2 \times 3 = 6$$

Solution:

Set index of scale D to 3 on scale C (multiplier) by moving setting indicator 22.
Set 2 on scale A (number) to indicator line 22 by rotating disc 1.
Read result—6 at "result" indicator 23, on scale B.

Three scales must be used, each of which is designated for one ingredient of the computation. Scale C, designated for the multiplier, scale A, designated for the number and scale B, designated for the result. Each is indicating one different ingredient, and each has its own indicator, 24, 22, 23. Four members are applied. The housing member 2 with scale C on it, the indicator ring member 3, the scales A and B on rotating disc member 1, and the result indicator member 5. The procedure consists of the mechanical setting of designated scales, without setting rules.

Illustrative Example No. 2 illustrates a simple division:

$$\frac{6}{3} = 2$$

Solution:
Set 3 on scale D (divisor) to index of scale C by moving setting indicator 22. Set 6 on scale A (number) to indicator line 22 by rotating disc 1.
Read result—2 at "result" indicator 23, on scale B.

The procedure and its character are similar to the procedure in Example No. 1, except that the designated "divisor" scale is used, which determines the character of the computation, which is in this case a division. Again three coacting scales, D, A, B, are applied, with three indicators (24, 22, 23), one for each of the three ingredients and the procedure consisted of the setting of designated scales without any setting rules. Prior slide rules apply two scales, different rules for the different computations, indicate the result at various locations of the scale and have one indicator, which, when indicating results, have lost its previous indications, i. e., the two factors of the computation.

Illustrative Example No. 3 illustrates a combined computation involving a division and a multiplication.

$$\frac{6}{2} \times 4 = 12$$

Solution:
Set the proportion 6/2 by setting 6 on scale C and 2 on scale D in alignment by moving setting indicator 22. Set 4 on scale A to indicator line 22—by rotating disc 1.
Read result at "result" indicator 23 on scale B.

In this combined computation four scales and four members are used. Scale C for the numerator 6, designated as "Multiplier." Scale D for the denominator 2, designated as "Divisor," and scale B for the result, designated as "Result."

At the end of the procedure all the three factors are indicated by separate indicators and similarly the result by its own indicator 23. One important feature of this device is that the result appears in Examples 1, 2 and 3 at the same permanent indicator and at the same location with the numbers in vertical position.

Prior slide rules indicate at the end of the procedure for instance in division the result only—and do not indicate the other factors, any more.

Examples 1, 2 and 3 demonstrate the simplicity and the more positive character of the procedure.

Illustrative Example No. 4: Reference is made to Figure No. 5, having two identical inverted sine cosine scales and two standard log-scales, all of them in one unit length. This example illustrates a multiplication of combined numerical and trigonometric terms. The problem relates to right triangles.

$$\text{sine } 30° \times 115 = 57.5$$

Solution:
Set index of scale D to 30° on sine scale C (multiplier) by moving setting indicator 22. Set 115 on scale A (number) to indicator line 22 by rotating disc 1.

Read result: 57.5 at permanent result indicator 23, on scale B.

Illustrative Example No. 5 illustrates a division of combined numerical and sine functions. Relates to problems in right triangles.

$$\frac{57.5}{\text{sine } 30°} = 115$$

The solution is similar to the solution of No. 4—except that the designated scale "Divisor sine" is applied, in accordance with the character of the problem, which is a division by a sine function.

Solution:
Set 30° on scale D to index of scale C, by moving setting indicator 22. Set 57.5 on scale A (number) to indicator line 22 by rotating disc 1.

Read result 115 at permanent "result" indicator 23 on scale B.

In Examples Nos. 4 and 5, two identical sine scales are applied on two different members—and two numerical scales are on a third member; altogether four scales on three members. Being the scales of different terms on different members the procedure with the different terms are separated—and more characterized.

This is an important improvement in slide rules—where different terms are involved and the simplicity of the solution is important.

Furthermore, in Examples Nos. 4 and 5, again, as in Examples 1, 2 and 3, three coacting scales are necessarily applied and all the three ingredients of the computation, sine 30°, 57.5 and 115 are indicated by three indicators, 24, 22, 23. The result 115 is indicated at the permanent "result" indicator 23 and is in vertical position. The procedure consists of mechanical application of labeled scales.

Prior slide rules have a pair of combined scales for such combined computations, as shown in Examples 4 and 5, one standard numerical and one sine scale in coacting relation to each other. Their procedure is different for multiplication and division. They indicate the results at different locations and in different positions in case of circular slide rules and they do not indicate the two factors, as my invention does.

Example 6 illustrates a problem in which the proportion of sine functions is multiplied by a numerical factor. This problem relates to problems of oblique triangles.

$$\frac{\text{sine } 80°}{\text{sine } 70°} \times 187.7 = (196.9)$$

Solution:
Set 80° on designated "Multiplier" scale C in alignment with 70° on designated "Divisor sine" scale D by moving setting indicator 22.

At this phase of the procedure the ratio of the two sine functions, $$\frac{\text{sine } 80°}{\text{sine } 70°}$$

is available at the result indicator—by setting the index of scale A. The ratio of sine functions is frequently used in trigonometry—and this solution is of advantage over former ones, on account of its simplicity. Prior slide rules have no direct solutions for proportions of trigonometric functions, having only one sine scale—and have to apply the proportion principle, formula and corresponding setting to solve such problems, which is more complicated than the solution shown above. Continuing the solution of this example:

Set 187.7 on designated scale "Number," A to indicate line 22, by rotating disc 1, then
Read result: 196.9 at permanent "result" indicator 23.

At this phase of the procedure, i. e., at the end of it all three ingredients are indicated by their respective indicators on designated scales.

$$\frac{\text{sine } 80°}{\text{sine } 70°}$$

by indicator 24, 187.7 by setting indicator 22, and 187.7 by result indicator 23. The procedure is simple and of positive character. In this operation four scales coacted, placed on three members, and, again, as in the previous cases, the result is indicated at the permanent result indicator 23. The procedure consists of three steps. Prior slide rules have no direct solution for proportions of trigonometric functions, their solution is indirect and requires five steps, instead of three steps in my invention.

To solve problems involving tangent, cotangent functions—the arrangement is similar to the arrangement shown in Fig. 5 indicating the arrangement for sine cosine problems. In case of tangent, cotangent functions involved C and D scales are two identical tangent cotangent scales, instead of sine cosine scales. The two identical inverted tangent, cotangent scales are applied. One, labeled "C," on the front face of ring 4, the other, labeled "D," on the front face of indicator ring member 3. Two identical standard numerical logarithmic scales, labeled "A," "B," both on disc 1 cooperate. All said four scales are of the same length, of one logarithmic unit.

The procedure with this arrangement of scales is the same as with the scales shown in Fig. 5, and is described in Examples 4, 5 and 6. The character of procedure, similarly, is the same as in computations with sine, cosine functions involved and thus their further explanation is not necessary.

Illustrative Example No. 7: Reference is made to Figure 6; which indicates a scale arrangement to solve exponential problems. Scales C and D are inverted standard logarithmic scales of one unit length. A and B are identical log-scales of the logarithms of numbers, i. e. log-log-scales. Scale C is designated as "Power" representing the power exponent by which the number is to be raised, scale D is designated as "Root" representing the root exponent by which the number is to be extracted.

The different exponents, as power and root exponents, are placed on different members, thus, the procedures with them are separated. The two log-log scales (A, B) representing the number and the result are on another member (disc 1) and adjacent to each other, designated and labeled, one for the number, the other for the result. They are indicated by two indicators, 22, 23.

The simplicity of the procedure and the separate use of the different terms on different members in the procedure is more evident in exponential problems, as will be shown hereinafter.

This example illustrates a power function.

$$2^{3.715} = 12.94$$

Solution:
Set index of scale D to 3.715 on scale C, designated as "Power" scale, by moving setting indicator 22.
Set 2 on scale A to indicator line 22, designated as "Number."
Read result: 12.94 at permanent result indicator 23.

Example No. 8 illustrates a root function.

$$\sqrt[3.715]{12.94} = 2$$

Solution:
Set to the index of scale C, 3.715 on scale D designated as "Root," by moving setting indicator 22.
Set 12.94 on scale A to indicator line 22 by rotating disc 1.
Read result: 2 at permanent result indicator 23 on scale B.

Here, again, as in the previous examples, the different ingredients are shown on different scales, by separate indicators for each ingredient. The power exponents on scale C is indicated by indicator 24, the root exponent on scale D by the same indicator 24, the number to be raised or to be extracted on scale A, and by setting indicator 22, finally the results on scale B and at the permanent result indicator 23 for both cases. The procedure has a positive character. Four scales and four members were coacting.

Prior slide rules have two combined coacting scales for the solution of exponential problems. They have to apply different rules in the procedures of different exponential problems. The result is indicated at different locations and in different positions with similar slide rules and they do not indicate the number and the exponent at the end of the procedure.

Example No. 9 illustrates an exponential problem in which the exponent is to be found.

$$2^{(3.715)} = 12.94$$

Solution:
Set 12.94 on scale B at result indicator 23 by rotating disc 1.
Set 2 on scale A to the indicator line 22 by moving setting indicator 22.
Read exponent 3.715 in power scale C, opposite setting indicator 22.

Example No. 10 illustrates an exponential problem in which the number to be raised to a power is to be found.

$$(2)^{3.715} = 12.94$$

Solution:
Set indicator line 22 to 3.715 on scale C designated as "Power."
Set 12.94 on scale designated as "Result" to indicator line 23 by rotating disc 1.
Read number 2 at indicator line 22 on scale A, designated as "Number."

The solution is direct, by designated scales for the exponent, result and number—and in a simple and positive procedure.

Prior slide rules have no direct solution for such problems, and they have to apply the proportion principle, the proportion equation, and follow it in the procedure—which evidently is more complicated than the procedure of my invention.

I claim:

1. A slide rule comprising a base member having a logarithmic scale thereon; a second member movably related to the first member and having thereon an identical logarithmic scale; a third member movably related with respect to the first two members and having thereon two identical logarithmic scales, of the same modulus as the first said two logarithmic scales but inverted with respect thereto; and an indicator fixed with respect to the base member, said indicator member cooperating with the indicia of one of said last two scales.

2. A slide rule comprising a stationary base member having a logarithmic scale thereon; a rotatable disc member in front of said base member, having scales on its front face; a rotatable indicator ring member, concentric with and in front of the marginal part of the disc member, having an indicator opening in alignment with a scale on the front face of the disc member and having a scale thereon cooperative with the scale on the base member; a stationary indicator member in front of and concentric with the disc member, set within the indicator ring member and fixed to the base member, having an annular indicator opening, in alignment with a scale on the front face of the disc member.

3. In a slide rule as set forth in claim 2, independent means for said movable indicator ring and disc members, adapted to move and set them independently of each other.

4. In a slide rule, as set forth in claim 2, independent supports for said indicator ring and disc members, said last mentioned two members having spaced relationship between them, with no frictional contact.

5. In a slide rule, as set forth in claim 2, an inwardly pointing peripheral indicator, disposed in the plane of the device, supported by and movable on the outer edges and cylindrical surface of the base member and held in position by a spring, fixed to the indicator, placed between the indicator and the outer cylindrical surface of the base member, the spring acting outwardly and radially, whereby the operation by the scales on the base and indicator ring members is facilitated and made more positive.

6. In a slide rule, as set forth in claim 2, means to designate the scales according to the functions of the elements of computations carried by the respective scales, whereby the procedures of computations are simplified.

OSCAR E. BÁTORI.

REFERENCES CITED

The following references are of record in the file of this patent:

UNITED STATES PATENTS

| Number | Name | Date |
|---|---|---|
| 843,944 | Hibbard | Feb. 12, 1907 |
| 922,465 | Fenn | May 25, 1909 |
| 1,017,719 | Watts | Feb. 20, 1912 |
| 1,075,124 | Scheibli | Oct. 7, 1913 |
| 1,961,295 | Hite | June 5, 1934 |
| 2,117,155 | Dussel | May 10, 1938 |
| 2,275,219 | Daemen | Mar. 3, 1942 |